Aug. 26, 1958 E. A. HERR 2,849,682
RECTIFIER GRADING APPARATUS
Filed Aug. 31, 1956 4 Sheets-Sheet 1

Inventor:
Erwin A. Herr
by Richard E. Hosley
His Attorney

Inventor:
Erwin A. Herr
by Richard E. Hosley
His Attorney

Aug. 26, 1958     E. A. HERR     2,849,682
RECTIFIER GRADING APPARATUS

Filed Aug. 31, 1956     4 Sheets-Sheet 3

Inventor:
Erwin A. Herr
by Richard E. Hosley
His Attorney

Inventor:
Erwin A. Herr
by Richard E. Hosley
His Attorney

United States Patent Office 2,849,682
Patented Aug. 26, 1958

2,849,682

RECTIFIER GRADING APPARATUS

Erwin A. Herr, Peabody, Mass., assignor to General Electric Company, a corporation of New York Application August 31, 1956, Serial No. 607,450

10 Claims. (Cl. 324—158)

The present invention concerns improvements in the testing of dry contact current rectifiers and, more particularly, relates to improved apparatus which quickly and accurately characterizes electrical qualities of rectifier cells.

In the manufacture of dry rectifier cells and stacks, it is important that electrical characteristics be sampled to assure quality and to enable optimum utilization of such rectifiers. The testing is preferably performed upon individual cells prior to their stacking; if this is to be done, whereupon it becomes possible to predict the stack characteristics, to fabricate stacks of cells meeting selected requirements, and to gather statistical data useful in controlling the manufacturing processes.

As is well known, practical dry contact rectifiers, such as selenium cells, fail to exhibit the desired zero and infinite resistances to current flow in opposite directions. Instead of the theoretical zero value of forward resistance, such rectifiers possess some low resistances to current flow in their forward or conducting direction, which results in undesired heating, voltage drops, and power losses. Likewise, in the reverse or blocking direction the resistance is high but not of the theoretically infinite value, such that there are still further heating effects, voltage drops, and power losses. These resistances determine the applications of dry rectifiers to a large extent. For example, when the applied voltage, desired output voltage, and desired output current are established, the cell characteristics will determine the number of cells to be used in each stack, the number of stacks which must be combined to satisfy the load requirements, the spacing and ventilation of cells for heat dissipation purposes, and so forth. And, of course, in some circuit arrangements cells must also be accurately matched, such that precision testing and grading are absolutely essential.

Heretofore, rectifier evaluation has been achieved under both so-called "static" and "dynamic" conditions. The former involves the application of direct current signals alternately in the forward and reverse directions, with attendant control and measurement of the currents and voltages. Because rectifiers are more commonly operated with impressed alternating current signals, however, the preferred evaluation is under the latter condition, with alternating current signals applied and with attendant control and measurement of the A. C. currents and voltages. In either case, the accuracies of measurement have been limited, the times required for such evaluations have been undesirably long, and the procedures and test apparatus have not readily lent themselves to automation. Through practice of the instant teachings, these and other difficulties are avoided, the apparatus and circuitry being such that actual operating conditions are simulated and highly precise and particularly significant information is obtainable within extremely short intervals.

Accordingly, it is one of the objects of the present invention to provide novel and improved apparatus for the precision evaluation of dry contact current rectifiers under closely-controlled dynamic conditions simulating intended electrical operating environments.

Further, it is an object to provide dynamic rectifier testing apparatus which is highly stable in operation and which is particularly simple to use in the accurate and rapid measurement and automatic grading of dry rectifiers.

By way of a summary account of the invention in one of its aspects, I provide for the insertion of individual rectifier cells singly into a line which is common to two current circuits which each conduct independent alternating currents. The alternating currents flow in these two circuits only during different half cycles of a reference A. C. excitation signal because of the influence of properly polarized and controlled thyratron tubes which are present, one in each of the two current loops. This circuitry results in current flow through the rectifier in its forward or conducting direction and also through only one of these circuits during one half cycle of the excitation, and results in current flow through the rectifier reverse or blocking direction and also through only the other of the two circuits during the next succeeding half cycle of the excitation. Load resistances and variable transformer devices independently in each of the two circuits provide for the adjustment of the circuit currents to predetermined values, as measured by separate current-responsive instruments. Simultaneously, the voltage drops across the rectifier under test and due to currents flowing during the different half cycles of excitation are separately measured by measuring circuits fully synchronized with the A. C. excitation, whereby voltage drops in the undesired directions are rejected by each of the voltage measuring circuits. Ranges of forward voltage and reverse voltage characterize the grade of each cell tested, and automatic indication and selection are performed on the basis of such characteristics.

Although the features of this invention which are believed to be novel are set forth in the appended claims, additional details and further objects and advantages may be most readily perceived through reference to the following description taken in connection with the accompanying drawing, wherein:

Figure 1 provides a simplified schematic diagram of a complete rectifier testing system, the metering and grading portions thereof being portrayed by block diagram elements;

Figure 2 presents wave-form plots for signals appearing in the circuitry of Figure 1;

Figure 3 is a schematic diagram of a forward voltage metering circuit;

Figure 4 presents wave-form plots for signals appearing in the metering circuit of Figure 3;

Figure 1:
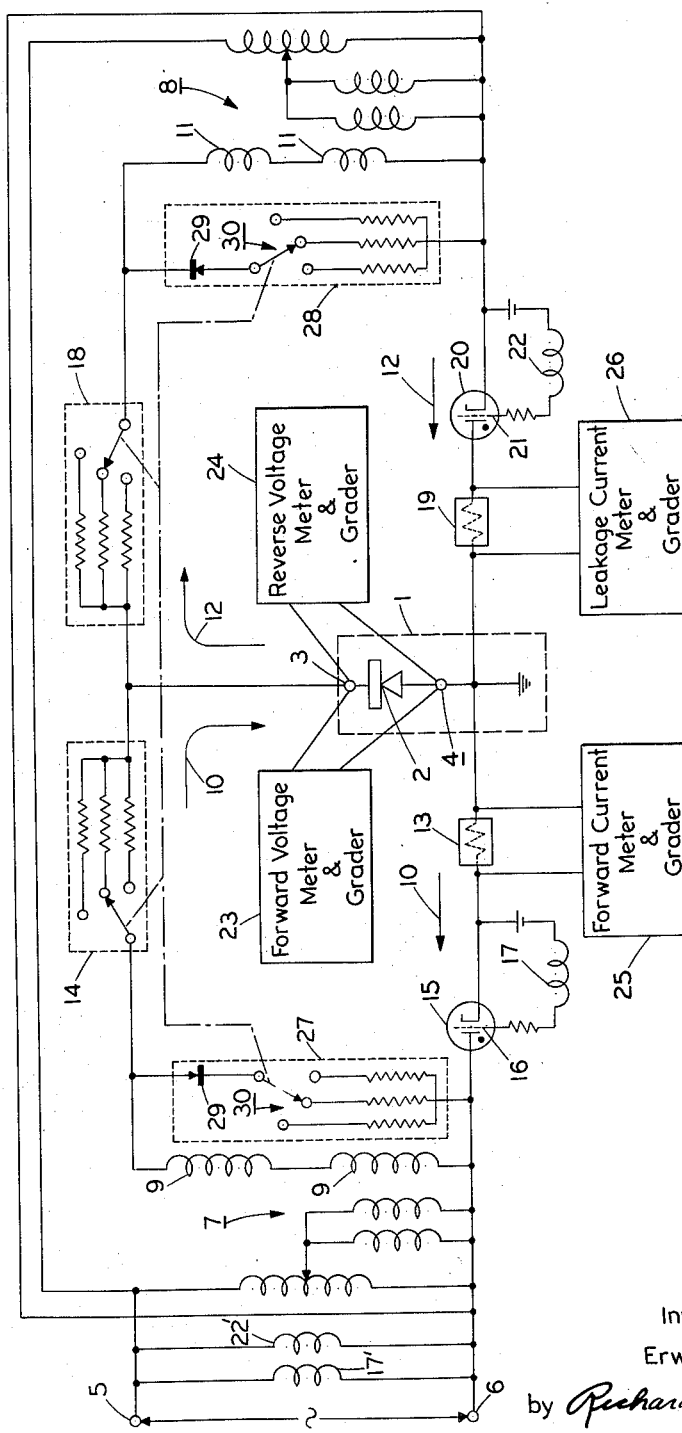

The arrangement for practicing this invention which appears in Figure 1 includes a suitable testing station 1 wherein a cell 2 is coupled with test terminals 3 and 4 for evaluation of its electrical characteristics. Behavior under dynamic conditions simulating those of intended applications is evaluated through use of electrical excitations derived from alternating current input terminals 5 and 6. Two major separate current loops are fed by this input, each being energized by the output of a different one of the two variable transformers 7 and 8, which are of known types. Output windings 9 of variable transformer 7 occasion periodically-varying electron flow in the direction of arrows 10, for example. And, output windings 11 of variable transformer 8 occasion periodically-varying electron flow in the direction of arrows 12. These periodically-varying flows of electrons occur synchronously and alternately, that is, during one half cycle of duration corresponding to the duration of a half cycle of the supply at terminals 5 and 6 the electron flow through cell 2 is in the forward direction of arrow 10, and during the next equal half cycle it is in the reverse direction of arrow 12. The two currents are isolated from one another, however, and flow through different electrical components except for their common circuit component, cell 2.

This separation of the cell currents in the forward and reverse directions is highly advantageous in that most precise measurements and individual control can then be made of them. For these purposes, the forward current loop includes a series precision resistance 13 the voltage drop across which is proportional to the current flow in the forward direction of rectifier cell 2. The series load resistance box 14 in the same loop enables control of the forward current such that it may be caused to assume a predetermined value. Forward current flow is confined strictly to the one current loop by the series-connected thyratron tube 15. This tube is of a gas- or vapor-filled type which conducts only in one direction and which requires only a relatively small impressed plate-cathode voltage. Further, the control grid 16 of tube 15 is polarized by the secondary 17 of a transformer having a primary 17' excited through supply terminals 5 and 6. As soon as the alternating voltage output of windings 9 rises to a small instantaneous magnitude, tube 15 is caused to fire and the electron flow therethrough and through cell 2 is in the direction of arrow 10. However, when the instantaneous output of windings 9 reverses polarity, the tube 15 blocks conduction and precludes electron flow in this direction. Such blocking is assured by the high negative bias then appearing on thyratron grid 16 due to the output of the transformer secondary 17.

Current flow in the reverse direction of cell 2 is controlled by resistance box 18 such that predetermined reverse currents will be caused to flow through the cell and the series-coupled precision measurement resistance 19. Reverse or leakage current flow is also strictly limited to certain periods, by the series-coupled thyratron 20. Tube 20 functions in the manner described hereinabove with reference to thyratron 15, its control grid 21 being under influence of output from the secondary 22 of a transformer having a primary winding 22' coupled across supply terminals 5 and 6. Phasings in the reverse current circuit are such that electron flow in reverse direction 12 occurs only during the alternate half cycles when electrons do not flow in the forward current circuit. Thus it results that while the two current circuits include the same rectified cell under test the forward and reverse currents are wholly isolated.

Voltage drops across the rectifier cell 2 in the forward and reverse directions are measured and provide the basis for grading the cell according to certain qualities. Accordingly, a forward voltage meter and grader 23 is coupled across the test terminals 3 and 4, as is also a reverse voltage meter and grader 24. Current measurements and rectifier grading based upon such measurements are performed by a forward current meter and grader 25 coupled across precision resistance 13 in the forward current circuit, and by a leakage current meter and grader 26 coupled across precision resistance 19 in the reverse or leakage current circuit. These meter and grader components are discussed in detail later herein.

It will be observed that in the forward current circuit, the variable transformer output or secondary windings 9 are shunted by a circuit 27 enclosed by dashed lines, and that a like circuit 28 shunts the output windings 11 in the leakage current circuit. Circuits 27 and 28 each include a rectifier 29 and series load resistance unit 30 and function as wave-shape correcting or compensating circuits. During each half cycle when the associated thyratrons prevent current circulation in either the forward or reverse current circuit, the correcting circuit there draws current from the associated variable transformer output windings and thereby prevents magnetic unbalances from building up in the transformer core material. In this manner it is assured that the half-wave voltages applied across the rectifier cell under test are more nearly of a sinusoidal plot, this wave form being desirable for precision test purposes.

Figure 2:
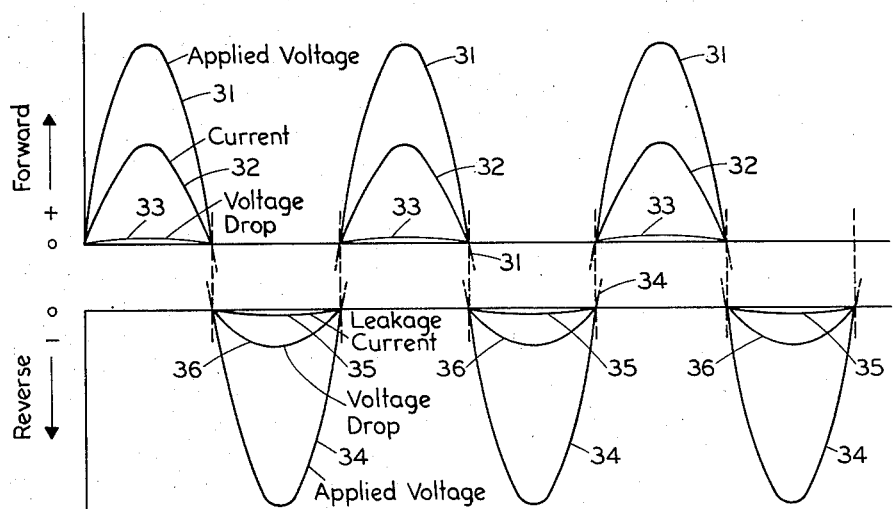

Reference to the signals plotted in Figure 2 aids in a further understanding of the operating characteristics of the system portrayed in Figure 1. These plots are illustrative, however, and are not intended to display exact values. And, for convenience, the abscissa represent the values at terminal 3, with the plots made as though these reference values are unchanging. The applied voltage in the forward current circuit is characterized by numeral 31 and represents that voltage appearing across the variable transformer output windings 9. The peak value of this voltage may be of the order of 400 volts, in one circuit arrangement. Alternate half cycles of this forward applied voltage are not illustrated in full because they are of no direct effect upon the measurement circuitry and instead occasion only the aforementioned transformer wave-shape compensating currents through circuit 27. Rectifier cell 2 of course possesses but a very small resistance to the flow of current in its forward direction and thus the resulting current 32 is substantial while the forward voltage drop 33 occurring across the cell is minute. A typical peak amplitude of such forward current for a one square inch selenium cell may be of the order of 0.755 ampere, with a peak value of forward voltage drop of about 2.0 volts. This current value obtains with appropriate adjustment of the load resistances 14.

No current is caused to flow through cell 2 and resistance 13 by the applied voltage 31 during its negative half cycles because tube 15 is then wholly non-conducting. However, at such times the reverse applied voltage 34 from the variable transformer output windings 11 is of proper polarity to force leakage current 35 through the rectifier cell 2, tube 20, and measurement resistance 19. Leakage current pulses 35 occasion high voltage drops 36 across the cell because of the high resistance to current flow in the reverse or blocking direction. Peak values of the sinusoidal current pulses 35 may be set at about 0.008 ampere, through adjustment of load resistances 18, to occasion peak values of the reverse voltage drop 36 which are about 84.0 volts, for a one square inch selenium cell. When the voltage 34 applied in the reverse direction changes polarity from that illustrated in full in Figure 2, the discharge tube 20 becomes non-conducting almost instantly and totally blocks leakage current flow through the cell, as well as blocking any flow through measurement resistor 19 due to signals in the forward current circuit.

Accordingly, it should be apparent that the measurement resistor 13 in the forward current circuit will have current flowing through it and will have proportional voltage drops across it which are related only to actual current conduction through the test cell 2 in the forward or conducting direction. Measurement of this voltage drop, as by the meter and grader 25, then provides a highly accurate indication of the forward current. All the while, the operating conditions of the cell 2 are dynamic, that is, it is responding to applied alternating currents and conducts during both half cycles of the applied signals. Likewise, the measurement resistor 19 in the leakage current circuit will have current flowing through it and will have proportional voltage drops across it which are related only to actual leakage current through the test cell. Measurement of the latter voltage drops, as by meter and grader 26, provides precise indications of only the leakage current under the dynamic operating conditions.

Figure 3:
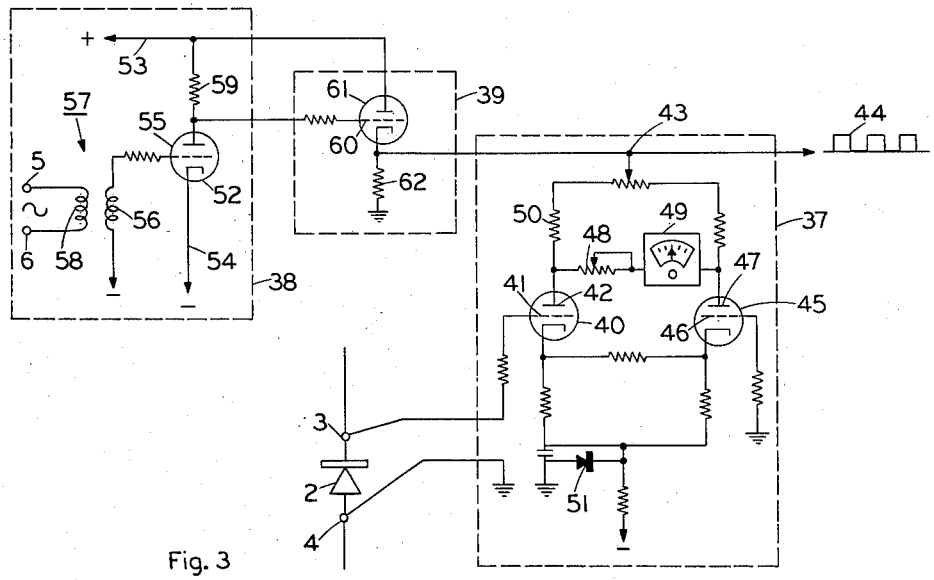

The forward voltage and reverse voltage drops across cells under test are both sensed at the same cell test terminals, and I therefore provide means whereby they are effectively separated from one another to enable the desired measurement accuracies to be realized. If voltmeters were connected directly across the rectifier cell, then the vastly different values of forward and reverse voltage drops could not be distinguished and there would be only one net reading which would lack important meaning. And, if the two voltage drops are sought to be separated by other rectifiers, such as vacuum-tube diodes, then the varying diode characteristics seriously affect the measurement accuracies. In accordance with certain of the present teachings, however, these two measurements are advantageously discriminated or distinguished in separate amplifier circuits having load current paths energized by half-wave square-wave signals. Figure 3 shows one such arrangement used in the measurement of the forward voltage drop across the test cell 2. Dashed-line unit 37 comprises the discriminating amplifier, which is in the preferred form of a differential amplifier, while unit 38 comprises a square-wave voltage source and unit 39 comprises an intermediate amplifier yielding square-wave outputs at the higher powers required by unit 37. Considering first the operation of vacuum tube 40 in unit 37, it is noted that the voltage drops across cell 2 are coupled to appear across the control grid 41 and cathode of this tube. Were a direct current supplied in the plate circuit, the potential variations at plate 42 would represent amplifications of both the forward and reverse voltage drops across the test cell 2, and no discrimination would result. Instead, however, the plate circuit is supplied with a square-wave energizing signal appearing between point 43 and ground, this signal having the wave-form identified by numeral 44 and having its positive pulses accurately synchronized with appearances of only the instantaneous forward voltage drops across cell 2. By "square-wave" it is of course meant that the wave form of the pulses may in fact be rectangular, in a geometric sense. Accordingly, tube 40 amplifies only the instantaneous forward voltage drops and is entirely incapable of responding to the reverse voltage drops applied to its control grid while its plate is unenergized. Because the plate supply pulses are of square-wave form, rather than sinusoidal, for example, the amplification of the essentially sinusoidal input is faithful and not distorted due to any dynamic operating characteristics of the tube. Aging, heating, and like variables may nevertheless influence the discriminating amplifier responses, and it is for this reason that another vacuum tube 45 is paralleled with tube 40 in a differential amplifier arrangement, the control grid 46 of tube 45 being maintained at a fixed potential. The two tubes may be conveniently enclosed within a single envelope, as is common, whereby their aging and general response to environmental and circuit conditions will be similar. Operating characteristics of the two need not be identical, however. Measurements are performed in the current circuit established between the tube plates 42 and 47 and including an adjustable resistance 48 and a series sensitive current-responsive indicating instrument 49. With amplification by tube 40 its plate voltage varies in accordance with current flowing through its load resistance 50, and the differing potentials at the plates 42 and 47 establish currents through instrument 49 which are precisely related to the forward voltage drop input. The scale of instrument 49 is suitably calibrated in terms of values of the forward voltage drop and/or in terms of the cell "grade" or quality. Rectifier 51 may conduct at certain times to prevent the tube cathodes from becoming unduly negative and occasioning tube conduction during supply half cycles when they should remain passive.

Synchronized square-wave voltages are generated in unit 38 which includes a triode 52 having a regulated direct current signal applied across its plate and cathode supply leads 53 and 54. The control grid 55 of this tube is normally biased strongly negative to preclude tube conduction except upon appearance of positive half cycles of alternating voltage in the secondary 56 of transformer 57. The transformer primary 58 is coupled across the input supply terminals 5 and 6 which also serve as the principal supply terminals for the forward and leakage current circuits of Figure 1. Secondary 56 delivers particularly high amplitudes of voltage to control grid 55 such that tube conduction during positive half cycles is of maximum duration and saturation occurs almost instantly. Additionally, the tube is cut off almost instantly as the grid voltage goes negative. Voltages at the plate side of load resistance 59 alternate abruptly between high and low values, thereby yielding a square-wave output which is applied to the control grid 60 of an amplifier tube 61. The latter is also energized by the regulated direct current source and yields the desired high-power square-wave output from across its cathode resistor 62. It is this output, 44, which energizes the differential amplifier measurement unit 37 with appropriate synchronization to occasion response to only the cell forward voltage drops.

Figure 4:
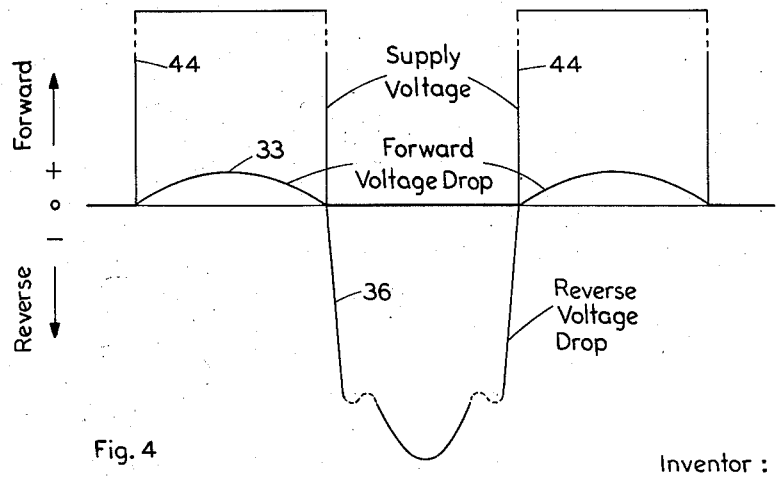

In Figure 4 the square-wave supply 44 in the forward voltage measurement unit is plotted in its phase relation to the forward voltage drop 33 and reverse voltage drop 36 appearing across the rectifier cell 2 which is undergoing test. The plots of voltage drops 33 and 36 are as in Figure 2, though enlarged. The phase synchronization is immediately apparent, and it becomes obvious that there can be no measurement response to the reverse voltage drop because the plate circuit supply voltage 44 for measurement tubes 40 and 45 is zero whenever the reverse drop occurs.

Figure 5:
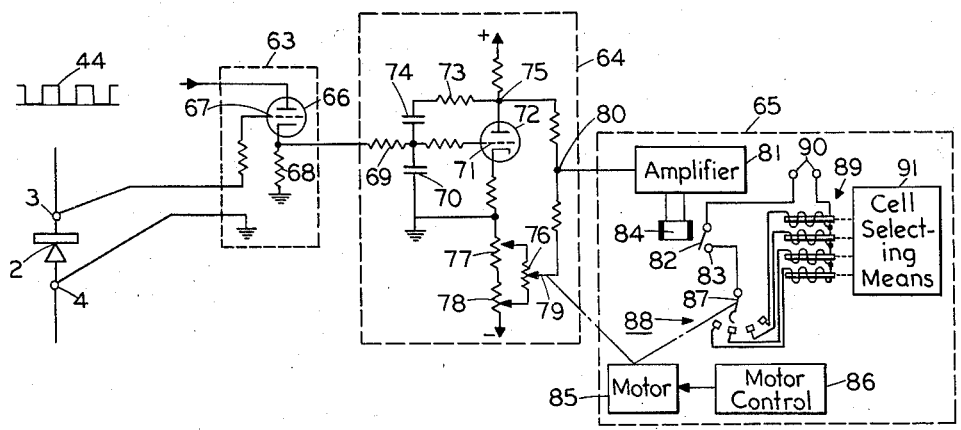
Figure 5 is a schematic and block-diagrammed showing of a forward voltage grader.

Grading of the tested cells may for example involve physically marking them with identification of their characteristics, as by stamping or printing, or may involve automatic physical selection of the cells, as by automatically depositing them in special bins. One suitable arrangement is depicted in Figure 5 and concerns grading in accordance with the forward voltage drop across test cell 2. This arrangement includes three principal components, each enclosed by dashed lines: a discriminating amplifier 63; an integrating unit 64; and a grader unit 65. Amplifier tube 66 discriminates the cell forward voltage signals from the reverse voltage signals because of the square-wave plate voltage 44 applied thereto. As in the case of the discriminating amplifier 37 shown in Figure 3, amplifier 63 responds to the cell voltages applied to its control grid 67 and yields a faithful reproduction thereof because the tube plate circuit supply is unvarying during the half cycles when cell forward voltage drops appear. Amplifier output is taken from across the cathode resistance 68 and is delivered to the integrating network comprising resistance 69 and capacitance 70. Isolated and amplified half-wave sinusoidal pulses corresponding to the forward voltage drop pulses are integrated in this network and then applied to the control grid 71 of amplifier tube 72 which has a regulated direct current plate supply. Resistance 73 and capacitance 74 in the plate-grid circuit function as a filter network. Values of the potential at plate terminal 75 are thus related to the integrated signals, and these values are compared with the direct current potentials tapped from a balancing potentiometer 76, the latter being associated with tapped resistances 77 and 78 in the regulated supply circuit. Accordingly, for any given forward voltage drop appearing across cell 2, there will be certain discrete positions of the resistance tap 79 which cause the potential at balance point 80 to be at zero or some predetermined potential level.

The grading operation is controlled by these potentials at point 80. Grader amplifier 81 responds to these potentials such that it closes the normally-open contacts 82 and 83 of relay 84 only when the potential at point 80 is of the predetermined value. And, the balancing resistance tap 79 is moved across or "scans" its associated resistance under influence of the motor 85 to cause a balanced condition, i. e., the appearance of the predetermined potential at point 80, to appear each time a rectifier cell is tested. Motor control unit 86 influences motor 85 such that it moves tap 79 between the positions at which resistor 76 produces a minimum balancing output voltage and at which it produces a maximum balancing output voltage during each cell test. In one form, the motor control may simply comprise switches operated manually or automatically to bring about such motor action. Simultaneously with actuation of balancing resistance tap 79 the motor 85 moves the wiper arm 87 of a selector switch 88 to position it sequentially along contacts each serially coupled with a different one of several solenoids 89. Each of these solenoids is energized by electrical signals applied to terminals 90 when relay contacts 82 and 83 are closed and when the selector switch wiper arm 87 rests upon its associated selector switch contact. Depending upon which of the solenoids 89 is actuated, the cell selecting means 91 performs a selection corresponding to a distinct grade or rating of the tested cell in terms of its forward voltage drop. Cell selecting means 91 may comprise different storage bins with trap doors operated by the solenoids, or any other suitable arrangement for physical separation and grouping of cells on the basis of their grades.

When a cell undergoes test, its forward voltage drop will occasion the appearance of a certain potential at point 80. This potential is opposed by opposite potentials from tap 79 which change with tap movements influenced by motor 85, until ultimately the potential at point 80 is balanced at a predetermined value which occasions closing of relay contacts 82 and 83. Meanwhile, motor 85 has also moved wiper arm 87 of selector switch 88 to a contact corresponding to a certain cell grade, range of positions of tap 79, and range of forward voltage drops. Signals impressed across terminals 90 then flow through contacts 82 and 83, selector switch 88, and a particular one of solenoids 89, whereupon the cell selecting means 91 performs a selecting operation insuring that cell 2 is properly classified.

Figure 6:
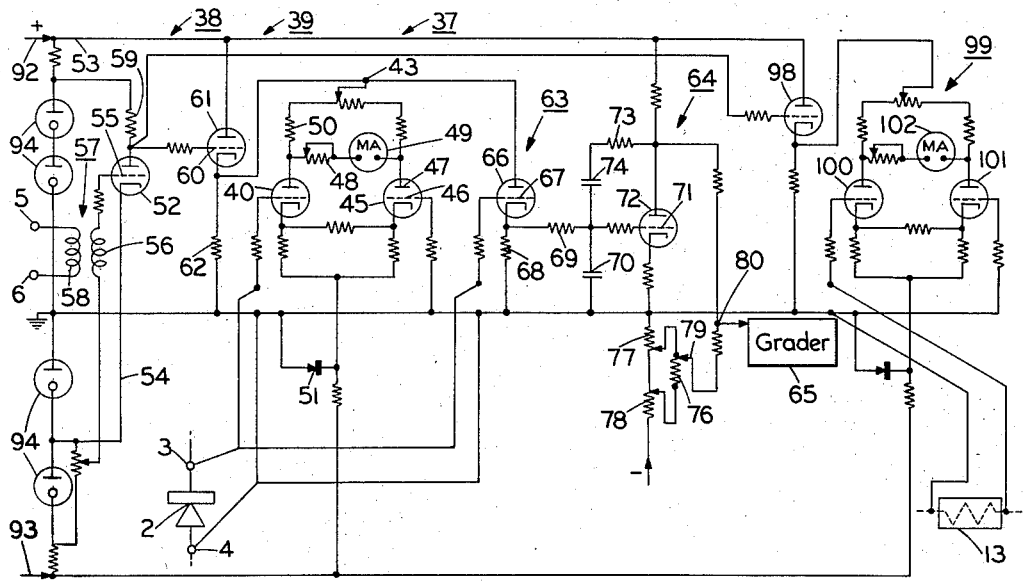
Figure 6 depicts schematically an arrangement for metering and grading in accordance with cell characteristics in the forward or conducting direction.
Figure 7:
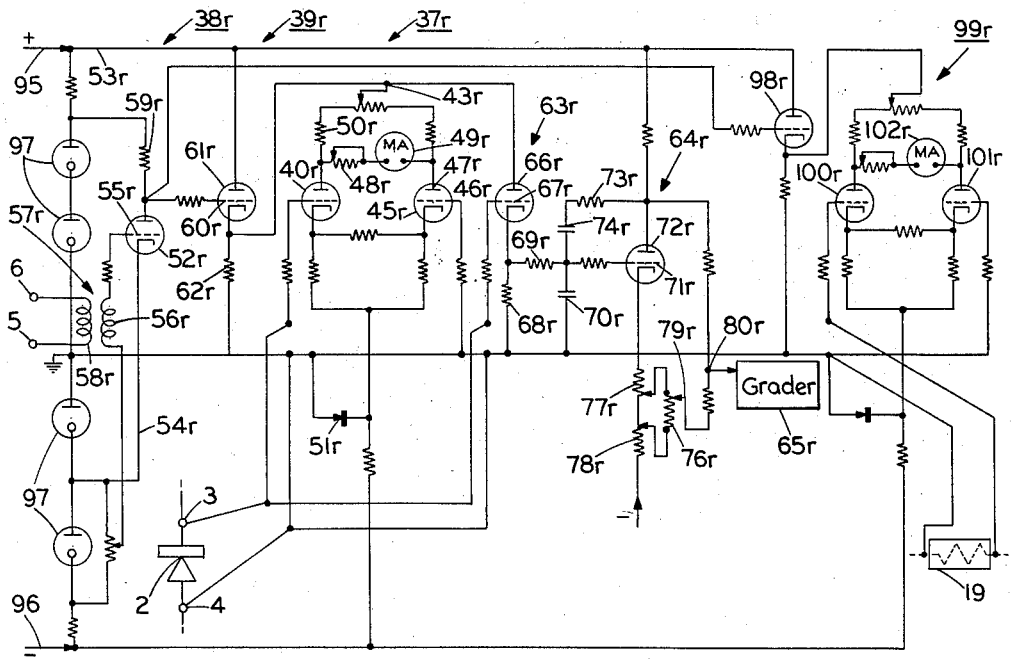
Figure 7 depicts schematically an arrangement for metering and grading in accordance with cell characteristics in the reverse or blocking direction.

In Figures 6 and 7 there are represented the detailed circuitry of the meter and grader units for the forward and reverse current circuits, respectively, which appear in block-diagram form in Figure 1. Figure 6 is shown to include the forward voltage arrangements of both Figures 3 and 5, corresponding parts bearing the same reference characters. Regulated direct current excitation is supplied across the leads 92 and 93, suitable voltage regulator output tubes 94 being depicted. Operation is as described earlier herein with reference to Figures 3 and 5. Like components and units are set forth in Figure 7 for the measurement and grading based upon reverse voltage drops across the test cell 2. For the purpose of minimizing descriptions paralleling those already made with reference to the forward voltage drop circuitry, the reverse voltage drop components are identified by the same reference characters as those used for corresponding components in the forward voltage drop circuitry, in Figures 3, 5, and 6, except for the addition of the smaller letter "r" intended to suggest the "reverse" circuit component. It will thus be readily understood that the reverse current circuitry of Figure 7 is like that of the forward current circuitry, and that it operates in a like manner. The square-wave signals in the Figure 7 circuitry are of course just 180 degrees out of phase with those in the forward current circuitry of Figure 6, however, such that the earlier-described discriminating effects single out only the reverse voltage voltage drops across cell 2 and render the operation independent of the forward voltage drops. This results from reversed phasing in transformer 57r, as compared with the phasing in transformer 57 in Figure 6. Regulated direct current excitation appears in Figure 7 across input leads 95 and 96, voltage regulating tubes 97 being illustrated in this portion of the circuitry.

Referring once again to Figure 6, it will be observed that a second cathode follower type amplifier tube 98, like tube 61, is excited by the output of the square-wave generator tube 52, and that the output of its amplifier circuitry provides the plate excitation for a differential amplifier 99 having the two amplifier tubes 100 and 101 and current-responsive instrument 102 in circuit. These circuit units enable a precise measurement to be made of the forward current through cell 2, independently of any leakage currents. The discriminating actions are like those produced in response to forward voltage drops. Tube 98 functions in the manner earlier described with reference to tube 61, and the differential amplifier 99 functions in the manner earlier described with reference to differential amplifier 37. Instrument 102 is calibrated to indicate forward current values, however. Response of the differential amplifier unit 99 is to a voltage input between ground and the grid 103 of tube 100, this voltage being that across the resistance 13 in the forward current circuit. Corresponding elements and units appear in Figure 7, with like reference characters distinguished by the addition of the letter "r," the measurement by instrument 102r there being only of the leakage current as represented by the proportionate voltage drops across the leakage circuit resistance 19.

Gradings based upon the forward and leakage current values may be performed by use of units corresponding to units 63, 64, and 65 in Figure 6, except that the input to tube 66 in unit 63 is taken from across resistance 13, in the case of forward current grading, and from across resistance 19 in the case of leakage current grading. These are not separately illustrated and described because the present teachings render the resulting arrangements wholly obvious to those skilled in the art.

The aforesaid current measurements involving very highly accurate discrimination of the forward and leakage currents may be desirable where the greatest precision is essential, or where a common resistance carries both the forward and leakage currents. For example, such discriminating circuitry is required where resistances 13 and 19 in Figure 1 are replaced by a single resistance serially coupled with cell 2 and common to both the forward and leakage flow paths, as rectifier cell 2 itself is. Otherwise, however, the forward current meter in Figure 1 may simply comprise an accurate and sensitive ammeter in place of resistance 13 or a precision sensitive voltmeter coupled across resistance 13. Leakage current may likewise be measured by an ammeter in place of resistance 19 or a sensitive voltmeter across resistance 19. When the currents are sensed in this way, it is unnecessary for the amplifiers in the current grading units to be of the phase-sensitive type. For example, the current grading unit of Figure 5 would not require square wave excitation for the amplifier tube 66, with a D.-C. plate supply being satisfactory. The excitation between control grid 67 and the cathode of tube 66 would of course be taken from across resistance 13 or 19, with suitable fixed bias added if desired.

Measurement and grading of cells is most commonly required on the basis of forward and reverse voltage drops alone, while predetermined constant values of current flow in the forward and leakage current circuits. Thus these currents are established by adjusting the resistance boxes 14 and 18, Figure 1, and variable transformers 7 and 8, until the forward and leakage currents are of desired values, as indicated by instruments 102 and 102r, Figures 6 and 7. The forward voltage indicated by instrument 49 and the reverse voltage indicated by instrument 49r are then the criteria of the cell characteristics, and graders 65 and 65r, Figures 6 and 7, select or grade the cell according to one or both of such voltages.

The specific embodiments of the invention herein disclosed are intended to be of a descriptive rather than a limiting nature, and various changes, combinations, substitutions, or modifications may be employed in practice of these teachings without departing either in spirit or scope from this invention in its broader aspects.

What I claim as new and desire to secure by Letters Patent of the United States is:

1. Apparatus for the testing of dry current rectifiers comprising a source of periodically varying electric current, means impressing signals derived from said source across one of said rectifiers to cause currents to flow therethrough, means responsive to said signals producing half-wave electrical output signals synchronized with and of the same periodicity as said periodically varying current, electrical discriminating amplifier means having an output current circuit and an input circuit controlling the flow of currents in said output circuit, means energizing said output current circuit with said half-wave signals, means applying voltage from across said one rectifier to said input circuit, whereby only those voltage drops of one polarity across said rectifier are amplified in said amplifier means, and measuring means responsive to currents in said output circuit.

2. Apparatus for the testing of dry current rectifiers comprising a source of alternating electric current, means impressing signals derived from said source across one of said rectifiers to cause forward and leakage currents to flow therethrough alternately and periodically, phase-sensitive electrical amplifier means having an output current circuit and an input circuit for controlling the flow of currents in said output circuit, means applying to said input circuit alternating current signals responsive to said forward and leakage currents through said one rectifier, means energizing said output circuit with signals having the same periodicity as and synchronized with said alternating current source, and measuring means responsive to currents in said output circuit.

3. Apparatus for the testing of dry current rectifiers comprising a source of alternating current, means impressing alternating current signals from said source across one of said rectifiers to cause forward and leakage currents to flow therethrough, first generating means responsive to said alternating current signals producing half-wave electrical output signals synchronized with and of the same periodicity as said alternating current signals, second generating means responsive to said alternating current signals producing half-wave electrical output signals synchronized with and of the same periodicity as said alternating current signals and displaced 180 degrees in phase from said output signals of said first means, first and second electrical discriminating amplifier means each having an output current circuit and an input circuit for controlling the flow of currents in said output current circuit thereof, means energizing said output current circuits of said first and second amplifier means with said half-wave output signals from said first and second generating means, respectively, means applying voltages from across said one rectifier to said input circuits of said first and second amplifier means, whereby only the voltage drops across said rectifier due to said forward currents are amplified in one of said amplifier means and only the voltage drops across said rectifier due to said leakage currents are amplified in the other of said amplifier means, and first and second measuring means responsive to currents in said output circuits of said first and second amplifying means, respectively.

4. Apparatus for the testing of dry current rectifiers comprising a source of alternating current, terminals for connection across a rectifier undergoing test, a pair of unidirectional current conducting devices each coupled in a different series circuit relationship with said terminals, means coupled with said source applying alternating current signals across each of the series combinations of said unidirectional devices and terminals, said unidirectional current conducting devices each conducting the current through said rectifier only during different half cycles of said alternating current signals, a pair of current measuring instruments each responsive to the currents through a different one of said unidirectional devices, first generating means excited by said source producing half-wave electrical output signals synchronized with and of the same periodicity as said alternating current signals, second generating means excited by said source producing half-wave electrical output signals synchronized with and of the same periodicity as said alternating current signals and displaced 180 degrees in phase from said output signals of said first generating means, first and second electrical discriminating amplifier means each having an output current circuit and an input circuit for controlling the flow of currents in said output current circuit thereof, means energizing said output current circuits of said first and second amplifier means with said half-wave output signals from said first and second generating means, respectively, means applying voltages from across said rectifier terminals to said input circuits of said first and second amplifier means, whereby only the voltage drops across said rectifier terminals due to forward currents through said rectifier are amplified in one of said amplifier means and only the voltage drops across said terminals due to leakage currents through said rectifier are amplified in the other of said amplifier means, and first and second means each responsive to currents in a different one of said output circuits of said first and second amplifying means and characterizing the electrical qualities of said rectifier under test.

5. Apparatus for the testing of dry current rectifier cells comprising a source of alternating current, terminals for connection across a rectifier cell undergoing test, a pair of unidirectional current conducting devices each coupled in a different series circuit relationship with said terminals, means coupled with said source applying alternating current signals across the series combinations of said unidirectional devices and terminals, said unidirectional current conducting devices each conducting the current through said rectifier cell only during different half cycles of said alternating current signals, load impedance means in circuit with each of said unidirectional devices adjustable to regulate the amplitudes of the currents through said rectifier cell during said different half cycles of said alternating current signals, a pair of current measuring instruments each responsive to the currents through a different one of said unidirectional devices, first generating means excited by said source producing half-wave square wave electrical output signals synchronized with said alternating current signals, second generating means excited by said source producing half-wave square wave electrical signals synchronized with said alternating current signals and displaced 180 degrees in phase from said output signals of said first generating means, two pairs of electrical discriminating amplifier means, each of said amplifier means having an output current circuit and an input circuit for controlling the flow of currents in said output current circuit thereof, means energizing the output circuits of each pair of said amplifier means with half-wave square wave output signals from said first and second generating means, respectively, means applying voltages from across said rectifier cell terminals to said input circuits of said amplifier means, whereby only the voltage drops across said rectifier cell terminals due to forward currents through said rectifier cell are amplified in one of said pairs of amplifier means and only the voltage drops across said terminals due to leakage currents through said rectifier cell are amplified in the other of said pairs of amplifier means, first and second current measuring means each separately responsive to currents in one of the two output circuits in each of said pairs of amplifying means, and first and second grading means each separately responsive to currents in the other of the two output circuits in each of said pairs of amplifying means performing a mechanical operation upon said rectifier cell which characterizes an electrical characteristic thereof.

6. Apparatus for the testing of dry current rectifier cells comprising a source of alternating current, terminals for connection across a rectifier cell undergoing test, a pair of gas tubes each having a control grid controlling electrical discharges therethrough, means coupling each of said tubes in a different series circuit relationship with said terminals, means coupled with said source applying alternating current signals across each of the series combinations of said gas tubes and terminals, means energized by said source applying alternating current signals of opposite phase to the control grids of said tubes to cause each of said tubes to conduct the current through said rectifier cell only during different half cycles of said alternating current signals, a pair of current measuring instruments each responsive to the currents through said cell and a different one of said tubes, first and second phase-sensitive electrical amplifier means each having an output circuit and an input circuit for controlling the flow of currents in said output circuit, means applying to the input circuits of said amplifier means the alternating current voltage drops across said cell terminals, means energizing each of said output circuits with signals 180 degrees out of phase with the signals energizing the other of said output circuits, said signals energizing said output circuits being of the same periodicity as and synchronized with said alternating current source, and first and second means each responsive to currents in a different one of said output circuits and characterizing the electrical qualities of said rectifier cell under test.

7. Apparatus for the testing of dry current rectifier cells comprising a source of alternating current, terminals for connection across a rectifier cell undergoing test, a pair of gas tubes each having a control grid controlling electrical discharges therethrough, means coupling each of said tubes in a different series circuit relationship with said terminals, means coupled with said source applying alternating current signals across each of the series combinations of said gas tubes and terminals, means energized by said source applying alternating current signals of opposite phase to the control grids of said tubes to cause each of said tubes to conduct the current through said rectifier cell only during different half cycles of said alternating current signals, load impedance means in circuit with each of said tubes independently adjustable to regulate the amplitudes of the currents through said rectifier cell during said different half cycles of said alternating current signals, a pair of current measuring instruments each responsive to the currents through said cell and a different one of said tubes, first generating means excited by said source and producing half-wave square wave electrical output signals synchronized with said alternating current signals, second generating means excited by said source and producing half-wave square wave electrical signals synchronized with said alternating current signals and displaced 180 degrees in phase from said output signals of said first generating means, first and second electrical discriminating amplifier means each having an output current circuit and an input circuit for controlling the flow of currents in said output current circuit thereof, means energizing the output current circuits of said first and second amplifier means with half-wave square wave output signals from said first and second generating means, respectively, means applying voltages from across said rectifier terminals to said input circuits of said first and second amplifier means, whereby only the voltage drops across said rectifier terminals due to forward currents through said rectifier are amplified in one of said amplifier means and only the voltage drops across said terminals due to leakage currents through said rectifier are amplified in the other of said amplifier means, and first and second means each characterizing the electrical qualities of said rectifier under test responsive to currents in a different one of said output circuits of said first and second amplifier means.

8. Apparatus for the testing of dry current rectifier cells comprising a source of alternating current, means impressing signals derived from said source across one of said rectifier cells to cause forward and leakage currents to flow through said cell alternately and periodically, generating means responsive to said signals and producing half-wave square wave electrical signals synchronized with and of the same periodicity as said alternating current signals, differential amplifier means having a pair of vacuum tubes in parallel circuit relationship with one another, said vacuum tubes each having at least three electrodes including a control electrode, means applying said half-wave square wave signals across said paralleled vacuum tubes to cause periodic current flow therethrough, means biasing the control electrode of one of said vacuum tubes by a predetermined amount, means applying signals responsive to forward and leakage currents through said cell as excitation for the control electrode of the other of said vacuum tubes, and a measuring instrument responsive to differences in currents flowing through said vacuum tubes.

9. Apparatus for the testing of dry current rectifier cells comprising a source of alternating current, means impressing signals derived from said source across one of said rectifier cells to cause forward and leakage currents to flow through said cell alternately and periodically, generating means responsive to said signals and producing half-wave square wave electrical signals synchronized with and of the same periodicity as said alternating current signals, phase-sensitive amplifier means comprising at least one vacuum tube having at least three electrodes including a control electrode, means impressing said half-wave square wave signals across said vacuum tube to cause output current to flow therethrough periodically under influence of said control electrode, means applying to said control electrode as excitation therefor signals responsive to currents flowing through said rectifier cell, means responsive to said output currents producing electrical output signals characterizing an electrical characteristic of said cell, a source of reference signals, and selecting means responsive to differences between said output signals and reference signals mechanically characterizing said cell characteristic.

10. Apparatus for the testing of dry current rectifier cells comprising a source of alternating current, terminals for connection across a rectifier cell undergoing test, a pair of gas tubes each having a control grid controlling electrical discharges therethrough, means coupling each of said tubes in a different series circuit relationship with said terminals, means coupled with said source applying alternating current signals across each of the series combinations of said gas tubes and terminals, means energized by said source applying alternating current excitation of opposite phases to the control grids of said tubes to cause each of said tubes to conduct the current through said rectifier cell only during different half cycles of said alternating current signals, load impedance means in circuit with each of said tubes independently adjustable to regulate the amplitudes of the currents through said rectifier cell during said different half cycles of said alternating current signal, a pair of current measuring instruments each responsive to the currents through said cell and a different one of said tubes, means generating first half-wave square wave signals synchronized with said alternating current signals, means generating second half-wave square wave signals synchronized with said alternating current signals and displaced 180 degrees in phase from said first half-wave signals, two differential amplifiers each having a pair of vacuum tubes in parallel circuit relationship with one another, said vacuum tubes each having at least three electrodes including a control electrode, means applying said first half-wave signals across said paralleled tubes of one of said amplifiers and applying said second half-wave signals across said paralleled tubes of the other of said amplifiers, means applying the voltages across said cell terminals as excitation for the control electrode of one of each of said pairs of tubes, means biasing the control electrodes of the other of each of said pairs of tubes by predetermined amounts, a first measuring instrument responsive to differences in currents flowing through said paralleled tubes of one pair, a second measuring instrument responsive to differences in currents flowing through said paralleled tubes of the other pair, first and second phase-sensitive amplifiers each comprising at least one vacuum tube having at least three electrodes including a control electrode, means impressing said first and second half-wave signals across said tubes of said first and second amplifiers, respectively, to cause output currents to flow therethrough periodically, means applying the voltages across said cell terminals as excitation for the control electrodes of said tubes of said first and second amplifiers, means responsive to said output currents in said tube of said first amplifier producing electrical output signals characterizing one electrical characteristic of said cell, means responsive to said output currents in said tube of said second amplifier producing output signals characterizing another electrical characteristic of said cell, a pair of reference signal sources, first selecting means responsive to differences between said output signals of said first amplifier and one of said reference sources mechanically characterizing said one characteristic of said cell, and second selecting means responsive to differences between said output signals of said second amplifier and the other of said reference sources mechanically characterizing said other characteristic of said cell.

References Cited in the file of this patent

UNITED STATES PATENTS

| | | |
|---|---|---|
| 2,698,419 | Blair | Dec. 28, 1954 |
| 2,748,347 | Flaherty | May 29, 1956 |
| 2,776,407 | Halverson | Jan. 1, 1957 |